C. M. SPENCER.
Machines for Turning Heads of Bobbins.
No. 137,631. Patented April 8, 1873.
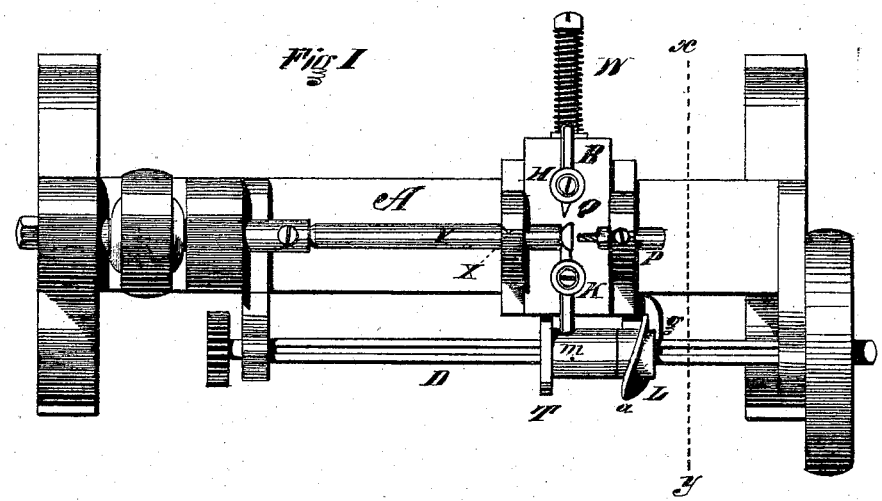
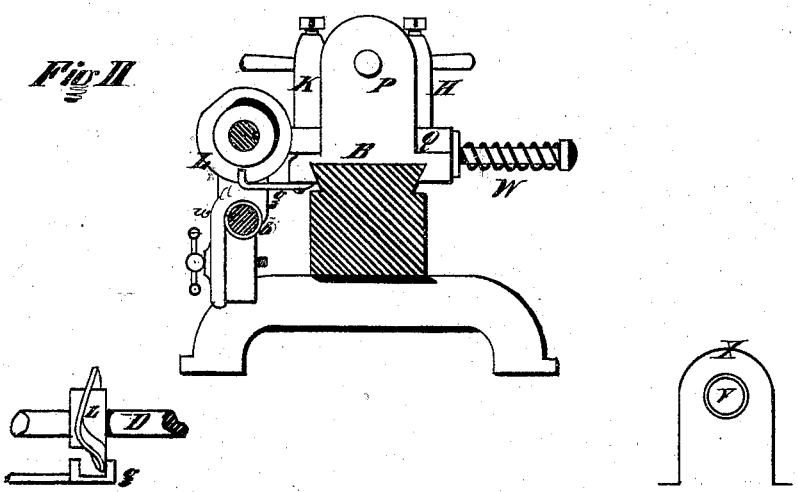

UNITED STATES PATENT OFFICE.

CHRISTOPHER M. SPENCER, OF HARTFORD, CONNECTICUT.

IMPROVEMENT IN MACHINES FOR TURNING HEADS OF BOBBINS.

Specification forming part of Letters Patent No. 137,631, dated April 8, 1873; application filed January 7, 1873.

*To all whom it may concern:*

Be it known that I, CHRISTOPHER M. SPENCER, of Hartford, Connecticut, have invented certain Improvements in Lathes, of which the following is a specification:

The object of my invention is the construction of a lathe that shall automatically drill, shape, and cut off from "stock" upon the bed such small articles as spool-heads for sewing-machine bobbins, washers, studs, &c., whether the stock be fed to the tools or the rest and carriage with its automatic devices be moved upon the stock.

In the drawing, Figure I is a top view; Fig. II, a cross-section upon the line $x\,y$ of Fig. I; Figs. III and IV being detail views of parts of my invention.

The tool-carriage B is moved upon the bed A by the collar $a$ carried upon the spline-shaft D by the feed-screw $b$, to which it is connected by the sleeve $m$ and nut $w$, the collar $a$ having a bearing against the side of the stop $g$ which proceeds from the tool-carriage. The nut $b$, when the carriage B has run the length of the bed, can be released from the feed-shaft to be returned with the tool-carriage to the opposite end of the lathe. The tool-posts K and H, holding, respectively, the shaping-tool and the one for cutting off the work when so shaped, rise from a slide, Q, upon the carriage, so that the release of the shaping-tool K from the work by the cam T upon the spline-shaft D is simultaneous with the advancement of the tool H by the coil-spring W; but, that the stock may be bored for a sufficient distance before being touched by the other tools, I form the collar $a$ rising from a hub into the cam L, and so arrange it in reference to the cam T that when the latter holds the tool-slide Q in the position that both tools K and H shall clear the stock V the cam L will advance the carriage B, and with it the drill P, which, after boring the stock, will, with the carriage, be retracted, and the carriage will be permitted to have lost motion while the tools are shaping and cutting off the button or other article being formed.

By this means I am able to automatically complete at one operation articles that have required to be submitted to some of the processes separately; and by means of the follow-rest X the stock can be held in a bushing, as shown in Fig. IV, always in the same position relative to the drill P.

What I claim is—

1. In combination with the carriage B capable of endwise movement on the bed H, and provided with the rest X and drill P, the transverse-sliding table Q with means for reciprocating the same, and provided with its tools.

2. In combination with subject-matter of first claim, the cams L and T, stop $g$, and shaft D.

3. The combination of slide B provided with the drill P, and transverse slide Q provided with the tools H and K, cams L and T, stop $g$, shaft D, feed-nut $w$, and feed-shaft $b$.

CHRISTOPHER M. SPENCER.

Witnesses:
C. N. SHIPMAN,
HENRY C. ROBINS.